United States Patent [19]

Ueno et al.

[11] Patent Number: 4,560,740

[45] Date of Patent: Dec. 24, 1985

[54] METHOD FOR PRODUCING AROMATIC POLYESTERS

[75] Inventors: Katsuji Ueno, Hirakata; Hiroaki Sugimoto, Takatsuki; Kazuo Hayatsu, Ibaraki, all of Japan

[73] Assignee: Sumitomo Chemical Company, Limited, Osaka, Japan

[21] Appl. No.: 606,378

[22] Filed: May 2, 1984

[30] Foreign Application Priority Data

May 12, 1983 [JP] Japan ................... 58-83728

[51] Int. Cl.$^4$ ................... C08G 63/18; C08G 63/60
[52] U.S. Cl. ................... 528/125; 528/126; 528/128; 528/173; 528/176; 528/179; 528/180; 528/181; 528/182; 528/190; 528/193; 528/194
[58] Field of Search ............... 528/173, 176, 179–182, 528/190, 125, 126, 128, 193, 194

[56] References Cited

U.S. PATENT DOCUMENTS 4,395,536 7/1983 Charbonneau ................... 528/179
4,412,057 10/1983 Asada ................... 528/179
4,485,230 11/1984 Yu ................... 528/179

Primary Examiner—Lester L. Lee
Attorney, Agent, or Firm—Stevens, Davis, Miller & Mosher

[57] ABSTRACT

In the method for producing aromatic polyesters having excellent moldability, good thermal resistance and little dependence on molding temperature and providing molded products having little anisotropy, obtained from (A) one or more compounds selected from aromatic dicarboxylic acids and their derivatives and (B) one or more compounds selected from aromatic dihydroxy compounds and their derivatives, or (A), (B) and (C) one or more compounds selected from aromatic hydroxycarboxylic acids and their derivatives, a method characterized in that polymerization is carried out in a reaction system containing, together with (A), (B) and optionally (C), a quinone compound (D) and/or a complex obtained from (B) and (D) as well as an organic carboxylic acid anhydride, or a reaction product thereof.

6 Claims, No Drawings

METHOD FOR PRODUCING AROMATIC POLYESTERS

The present invention relates to a method for producing aromatic polyesters having excellent moldability, good thermal resistance and little dependence on molding temperature as well as providing molded products having little anisotropy.

An aromatic polyester has excellent properties based on its structure. Particularly, aromatic polyesters comprising an aromatic dicarboxylic acid residue and aromatic dihydroxy compound residue and/or an aromatic hydroxycarboxylic acid residue are so superior in thermal resistance that they can be used for compression molding, transfer molding, injection molding, etc., and besides they are superior in mechanical and electrical properties. Consequently, they are used in various fields such as machine parts, electric and electronic parts, automobile parts, tablewares, medical instruments and the like.

But, when the aromatic polyesters are crystalline, various problems are caused in molding of large shear, for example, in injection molding: The polymer is easy to orient in such molding, so that a marked anisotropy appears in the molded product to produce a difference in percent shrinkage between the machine direction (MD) and the direction perpendicular thereto (TD); and when the molded product has a welded part, crystallization is easy to occur in a mold and welding is insufficient at the part to be welded, so that the strength of the part becomes low.

When the aromatic polyesters are noncrystalline, problems are caused in terms of hydrolizability at high temperatures and solvent resistance.

In order to solve these problems, many trials have so far been made; for example, there is a method of blending with other resins having good flowability, moldability and miscibility. Also, a method of blending the aromatic polyester with polyethylene terephthalate or polycarbonate and then molding is employed. However, because the molding temperature is high, the blended resins are sometimes decomposed. In low-temperature molding, molded products in which the resins have been uniformly dispersed are not obtained.

Another method employs the introduction of an aliphatic group such as an ethylene glycol residue into the structure of the aromatic polyester. Since this method reduces the intermolecular cohesive force, effects such as improvement in moldability, reduction in anisotropy, etc. can be achieved, but a reduction in thermal property results in most cases.

In view of this situation, the present inventors have extensively studied to improve the moldability of the aromatic polyester and inhibit the orientation on molding, and, as a result, found that this object can be attained by, on production of the aromatic polyester, carrying out polymerization in the reaction system to which a quinone compound and/or a complex obtained from the quinone compound and an aromatic dihydroxy compound as well as an organic carboxylic acid anhydride, or a reaction product thereof have been added.

According to the present invention, there is provided the following method: In the method for producing aromatic polyesters obtained from (A) one or more compounds selected from aromatic dicarboxylic acids and their derivatives and (B) one or more compounds selected from aromatic dihydroxy compounds and their derivatives, or (A), (B) and (C) one or more compounds selected from aromatic hydroxycarboxylic acids and their derivatives, a method characterized in that polymerization is carried out in a reaction system containing, together with (A), (B) and optionally (C), a quinone compound (D) and/or a complex obtained from (B) and (D) as well as an organic carboxylic acid anhydride, or a reaction product thereof.

That a quinone compound and/or a complex obtained from the quinone compound and an aromatic dihydroxy compound as well as an organic carboxylic acid anhydride, or a reaction product thereof are added to the reaction system wherein the starting materials for producing the aromatic polyester are present, is based on the fact that a quinone compound will produce polysubstituted (acylated) aromatic compounds by reaction with a carboxylic acid anhydride.

Referring now to this reaction (Thiele reaction), as can be seen in K. Thomas Finley's detailed explanation in the 17th section of The Chemistry of the Quinoid Compounds, Part 2 (edited by S. Patai, published by John Wiley & Sons Company, 1974), when, for example, benzoquinone is reacted with acetic anhydride in the presence of a mineral acid catalyst, 1,4-di-, 1,2,4-tri- and 1,2,4,5-tetra-acetylbenzenes are produced. In a word, polyfunctional ester compounds are produced by reaction of a quinone compound with an organic carboxylic acid anhydride. Further and quite surprisingly, the present inventors' found that polyfunctional esters are also formed by the reaction of acetic anhydride with a quinhydrone which is a complex obtained from p-benzoquinone and hydroquinone, or a diphenoquinhydrone which is a complex obtained from 4,4'-diphenoquinone and 4,4'-dihydroxydiphenyl. In short, it is believed that a quinone compound and/or a complex of the quinone compound with an aromatic dihydroxy compound will react with an acid anhydride to produce polyfunctional aromatic compounds which give a branched structure and crosslinked structure to the polymer.

Examples of compounds (A), (B) and (C) used in the present invention are terephthalic acid, isophthalic acid, 4,4'-dicarboxydiphenyl, 1,4-naphthalenedicarboxylic acid, 2,6-naphthalenedicarboxylic acid, 1,5-naphthalenedicarboxylic acid, hydroquinone, resorcinol, 4,4'-dihydroxydiphenyl, 2,2-bis(4-hydroxyphenyl)propane, 4,4'-dihydroxydiphenylmethane, 4,4'-dihydroxydiphenyl sulfone, 4,4'-dihydroxydiphenyl ether, 4,4'-dihydroxybenzophenone, 2,6-naphthalenediol, 1,4-naphthalenediol, 1,5-naphthalenediol, p-hydroxybenzoic acid, m-hydroxybenzoic acid, 2-hydroxy-6-naphthoic acid, 1-hydroxy-4-naphthoic acid, 1-hydroxy-5-naphthoic acid, 2-hydroxy-naphthoic acid, 4-(4'-hydroxyphenyl)benzoic acid and their derivatives. The compound (D) includes, for example, o-benzoquinone, p-benzoquinone, diphenoquinone, naphthoquinone, anthraquinone and perylene-3,10-quinone. As the complex between (B) and (D), quinhydrone, diphenoquinhydrone, etc. may be given.

The amount of the quinone compound (D) and/or a complex of (D) with the aromatic dihydroxy compound (B), which are added to the polymerization system, is preferably 0.3 to 5.0 mole% based on the total of (B) and (D) or (B) plus (B) and (D) contained in the complex. The reason for this is that, unless the amount is not less than 0.3 mole%, the effect of the branched structure is difficult to produce, and besides that, when the amount is more than 5.0 mole%, the proportion of the crosslinked part increases to lower the moldability as a whole, make the molded product brittle and lower the physical property thereof, from which the range of 0.3 to 5.0 mole% is considered to be suitable in terms of moldability and physical property.

Examples of the organic carboxylic acid anhydride added at the same time given for are given for acetic anhydride, propionic anhydride, maleic anhydride, phthalic anhydride and the like. The amount of the anhydride is not less than 80 mole%, preferably 100 to 150 mole% based on the quinone compound (D) or (D) in the complex. Amounts less than 80 mole% make the polyesterification difficult to occur, and those with more than 150 mole% are economically disadvantageous.

The same effect can also be noticed by bringing the quinone compound (D) and/or a complex obtained from (D) and the aromatic dihydroxy compound (B) into reaction with the organic carboxylic acid anhydride in advance, and then adding the resulting reaction product to the polymerization system together with other starting materials.

As the polymerization method, solution polymerization, interfacial polymerization, suspension polymerization, bulk polymerization, etc. are well known. But, suspension polymerization and bulk polymerization are preferred because there are many aromatic polyesters which are poor in solubility in organic solvents.

The polymerization is preferably carried out at 200° to 400° C., preferably 250° to 350° C. under normal or reduced pressure in an inert gas atmosphere. It is also possible to advance the polymerization using a catalyst of which the residue has no adverse effect on the physical properties of the aromatic polyester obtained, or which loses the activity by simple treatment.

The aromatic polyester thus obtained may be molded as such or in blends with reinforcing agents or fillers.

The present invention will be illustrated in more detail with reference to the following examples and comparative examples, which are however only given for the purpose of illustration and not to be interpreted as limiting the invention thereto.

Next, reference will be made to the words and the methods of measurement evaluation appearing in the examples. As a measure for the moldability of the resin, the temperature of the resin obtained as follows will be employed: The temperature of the resin is raised at a rate of 4° C./min under pressure of 100 kg/cm$^2$ using the Koka type flow tester (produced by Shimadzu Seisakusho, Ltd.), and a rate at which the resin flows out of the nozzle, 1 mm in diameter and 10 mm in length, is measured, and at that time, a temperature at which the apparent viscosity of the resin calculated from said rate is 48,000 poise (51/sec in shear rate) is employed. This temperature is called flow temperature.

Granulation was carried out using a twin-screw melt/kneading extruder PCM-30 (produced by Ikegai Iron Works, Ltd.). Injection molding was carried out using Neomat N 47/28 (1-ounce injection molding machine produced by Sumitomo Shipbuilding & Machinery Co.).

The tensile test was carried out using dumbbell-shaped test pieces molded by injection molding under the condition: distance between chucks, 40 mm; tensile rate, 5 mm/min; and chart rate, 250 mm/min.

For testing the strength of the welded part, a molded product, 3 mm in thickness, 12.5 mm in width and 64 mm in the outside length of each side, was produced by injection molding using a window frame-form mold having its gate at the center so as to produce welded parts, and measured for flexural strength.

EXAMPLE 1

To a polymerization reactor having an anchor-form mixing blade with a small clearance between the blade and its internal wall surface, were added 910.8 g (6.6 moles) of p-hydroxybenzoic acid, 547.8 g (3.3 moles) of terephthalic acid, 608.2 g (3.27 moles) of 4,4'-dihydroxydiphenyl, 5.5 g (0.03 mole) of 4,4'-diphenoquinone and 1,481.0 g (14.5 moles) of acetic anhydride. The resulting mixture, with stirring in a nitrogen atmosphere, was heated to 150° C. and refluxed for 3 hours at this temperature to carry out acetylation. Thereafter, acetic acid resulting from reaction was distilled off while raising the temperature, and the temperature was finally raised to 330° C. over about 2 hours under high shear. The polymerization was continued at this temperature for further 3 hours with powerful stirring, and after gradual cooling to 200° C., the polymer was taken out of the reactor. The yield of the polymer was 1,697 g, which corresponded to 98.5% of the theoretical amount. This polymer was pulverized with a hammer mill (produced by Someya Sangyo Co.) to obtain particles having an average diameter of 105 μm. This particle was placed in an aluminum container and treated at 330° C. for 6 hours in a nitrogen atmosphere. The flow temperature of the treated sample was 377° C. On granulating and injection-molding this sample, the surface roughness of the molded product by orientation was inhibited, and the appearance was also smooth. The processability was also good, and molded products having a sufficient strength at the welded part were obtained.

The values of the physical properties, etc. are shown in Table 1, from which it can be seen that the temperature dependence of the properties is also little.

EXAMPLES 2, 3 AND 4 AND COMPARATIVE EXAMPLE 1

Polymers were obtained in the same manner as in Example 1 except that the amount of 4,4'-diphenoquinone added to the reaction system was varies, and then evaluated. The results were shown in Table 1. As compared with Comparative example in which 4,4'-diphenoquinone was not added, the temperature dependence of the strength is little, and the appearance of the molded product is also good.

TABLE 1

| | Amount of 4,4'-diphenoquinone (mole %) (1) | Flow temperature of polymer powder (°C.) (2) | Molding temperature (°C.) (3) | Appearance of molded product | Tensile strength (kg/cm$^2$) | Tensile modulus (t/cm$^2$) | Flexural strength of welded part (kg/cm$^2$) |
|---|---|---|---|---|---|---|---|
| Comparative example 1 | 0 | 374 | 360 | Large surface roughness | 1,380 | 42 | 55 |
| | | | 380 | Large surface roughness | 1,570 | 47 | 70 |
| Example 2 | 0.6 | 375 | 360 | Good | 1,020 | 40 | 230 |
| | | | 380 | Good | 1,150 | 43 | 280 |

TABLE 1-continued

| | Amount of 4,4'-diphenoquinone (mole %) (1) | Flow temperature of polymer powder (°C.) (2) | Molding temperature (°C.) (3) | Appearance of molded product | Tensile strength (kg/cm$^2$) | Tensile modulus (t/cm$^2$) | Flexural strength of welded part (kg/cm$^2$) |
|---|---|---|---|---|---|---|---|
| Example 1 | 0.9 | 377 | 360 | Good | 820 | 40 | 280 |
| | | | 380 | Good | 950 | 40 | 290 |
| Example 3 | 1.2 | 382 | 360 | Good | 700 | 38 | 380 |
| | | | 380 | Good | 760 | 37 | 370 |
| Example 4 | 2.7 | 386 | 370 | Good | 580 | 36 | 310 |
| | | | 390 | Good | 570 | 37 | 300 |
| Comparative example 2 | 6.0 | 384 | 370 | Good | 342 | 32 | 140 |
| | | | 390 | Good | 353 | 35 | 120 |

(1) A ratio to the total amount of 4,4'-dihydroxydiphenyl and 4,4'-diphenoquinone.
(2) A value before granulation.
(3) Expressed by a cylinder temperature. Hereupon, the nozzle temperature was fixed to 10° C. lower than the cylinder temperature. In Example 4 and Comparative example 2, the molding temperature was raised by 10° C. in order to make the flowability equal to that in other examples.

COMPARATIVE EXAMPLE 2

A polymer was obtained in the same manner as in Example 1 except that the amount of 4,4'-diphenoquinone added was 6.0 mole%, and then evaluated. The result was shown in Table 1. The molded product had a good appearance, but probably because of a large proportion of a branched structure, it had a fairly lowered strength, showing that there is a problem in practical use.

EXAMPLE 5

To a 5-liter separable glass flask equipped with a reflux-condenser, a nitrogen-blowing tube and thermometer were added 745.2 g (5.4 moles) of p-hydroxybenzoic acid, 448.2 g (2.7 moles) of terephthalic acid chloride and 1.5 liters of xylene, and reaction was carried out for 5 hours under xylene refluxing, during which hydrogen chloride produced by the reaction was removed from the system by blowing nitrogen into the system and neutralized with sodium hydroxide. The conversion after 5 hours was 94%. To the flask were further added 492.16 g (2.646 moles) of 4,4'-dihydroxydiphenyl, 9.99 g (0.027 mole) of a diphenoquinhydrone complex and 661 g (6.48 moles) of acetic anhydride, and reaction was carried out for 3 hours under reflux. The diphenoquinhydrone used here was synthesized by mixing a benzene solution of 4,4'-diphenoquinone and an ether solution of 4,4'-dihydroxydiphenyl.

After completion of the reaction, the contents of the flask was transferred as liquid to the same reactor as used in Example 1, and polymerized in the same manner. The yield of the polymer obtained was 1483 g which corresponded to 98.8% of the theoretical amount. On pulverizing this polymer and applying heat-treatment in the same manner as in Example 1, the flow temperature of the polymer was found to be 376° C. This polymer was granulated, injection-molded and evaluated. The result is shown in Table 2. Both the appearance and physical properties of the molded product are better balanced than in Comparative example.

COMPARATIVE EXAMPLE 3

A polymer was obtained in the same manner as in Example 5, but adding no diphenoquinhydrone complex. The result of evaluation of polymer is shown in Table 2.

TABLE 2

| | Amount of diphenoquinhydrone complex added (mole %)* | Flow temperature of polymer (°C.) | Molding temperature (°C.) | Appearance of molded product | Tensile strength (kg/cm$^2$) | Tensile modulus (t/cm$^2$) | Flexural strength of welded part (kg/cm$^2$) |
|---|---|---|---|---|---|---|---|
| Comparative example 3 | 0.0 | 380 | 370 | Large surface roughness | 994 | 38 | Not more than 30 |
| | | | 390 | Large surface roughness | 1,430 | 43 | Not more than 30 |
| Example 5 | 1.0 | 376 | 370 | Good | 780 | 36 | 280 |
| | | | 390 | Good | 820 | 35 | 230 |

*A ratio to the total amount of 4,4'-dihydroxydiphenyl and diphenoquinone in the complex and 4,4'-dihydroxydiphenyl as a starting material.

EXAMPLE 6 AND COMPARATIVE EXAMPLE 4

In the same manner as in Example 1, a polymer was obtained by polymerizing 581 g (3.5 moles) of terephthalic acid, 249 g (1.5 moles) of isophthalic acid, 921 g (4.95 moles) of 4,4'-dihydroxydiphenyl, 9.2 g (0.05 mole) of 4,4'-diphenoquinone and 561 g (5.5 moles) of acetic anhydride. After pulverization and heat-treatment, the polymer showed a flow temperature of 369° C.

On granulating and molding this polymer, the appearance of the molded product was superior to that obtained from the system containing no 4,4'-diphenoquinone, showing no orientation marks. Also, the physical properties of the product were well balanced, as can be seen from that the tensile strength is 720 kg/cm$^2$, the tensile modulus is 32 t/cm$^2$ and the flexural strength of welded part is 300 kg/cm$^2$. While, the molded product obtained from the sample produced with no 4,4'-diphenoquinhydrone had a great deal of surface roughness, and because of orientation, the welded part was not in a condition of sufficient welding.

What is claimed is:

1. In a process for preparing aromatic polyesters wherein there is reacted (A) a compound selected from the group consisting of aromatic dicarboxylic acids and their derivatives and (B) a compound selected from the group consisting of aromatic dihydroxy compounds and their derivatives, or (A), (B) and (C) a compound selected from the group consisting of aromatic hydroxycarboxylic acids and their derivatives, the improvement comprising carrying out the reaction in a reaction system containing, together with (A), (B) and optionally (C), an organic carboxylic acid anhydride and a quinone compound (D) and/or a complex between (B) and (D).

2. A method for producing aromatic polyesters as described in claim 1, wherein the quinone compound (D) is benzoquinone, diphenoquinone, naphthoquinone or anthraquinone.

3. A method for producing aromatic polyesters as described in claim 1, wherein the molar ratio of the quinone compound (D) and/or a complex between (B) and (D) to the total of (B) and (D) or (B) plus the complex content of (B) and (D) is 0.3 to 5.0 mole %.

4. A method for producing aromatic polyesters as described in claim 2, wherein the molar ratio of the compound selected from a quinone compound (D) and/or a complex between (B) and (D) to the total of (B) and (D) or (B) plus (B) and (D) contained in the complex is 0.3 to 5.0 mole%.

5. In a process for producing aromatic polyesters wherein there is reacted (A) a compound selected from the group consisting of aromatic dicarboxylic acids and their derivatives, (B) a compound selected from the group consisting of aromatic dihydroxy compounds and their derivatives and (C) a compound selected from the group consisting of aromatic hydroxycarboxylic acids and their derivatives, the improvement comprising carrying out the reaction in a reaction system containing, together with (A), (B) and (C), an organic carboxylic acid anhydride and a quinone compound (D).

6. In a polymerization process for producing aromatic polyesters wherein there is reacted (A) a compound selected from the group consisting of aromatic dicarboxylic acids and their derivatives, (B) a compound selected from the group consisting of aromatic dihydroxy compounds and their derivates and (C) a compound selected from the group consisting of aromatic hydroxycarboxylic acids and their derivatives, the improvement comprising carrying out the polymerization in a reaction system containing, together with (A), (B) and (C), an organic carboxylic acid anhydride and a complex between (B) and a quinone compound (D).

* * * * *